No. 730,502. PATENTED JUNE 9, 1903.
Z. WHITTEMORE.
STREET SWEEPER.
APPLICATION FILED JAN. 27, 1902.
NO MODEL. 2 SHEETS—SHEET 1.

Witnesses:
P. M. Kelly
John Mac Master

Inventor
Zenas Whittemore
by
Attorney.

No. 730,502. PATENTED JUNE 9, 1903.
Z. WHITTEMORE.
STREET SWEEPER.
APPLICATION FILED JAN. 27, 1902.
NO MODEL. 2 SHEETS—SHEET 2.
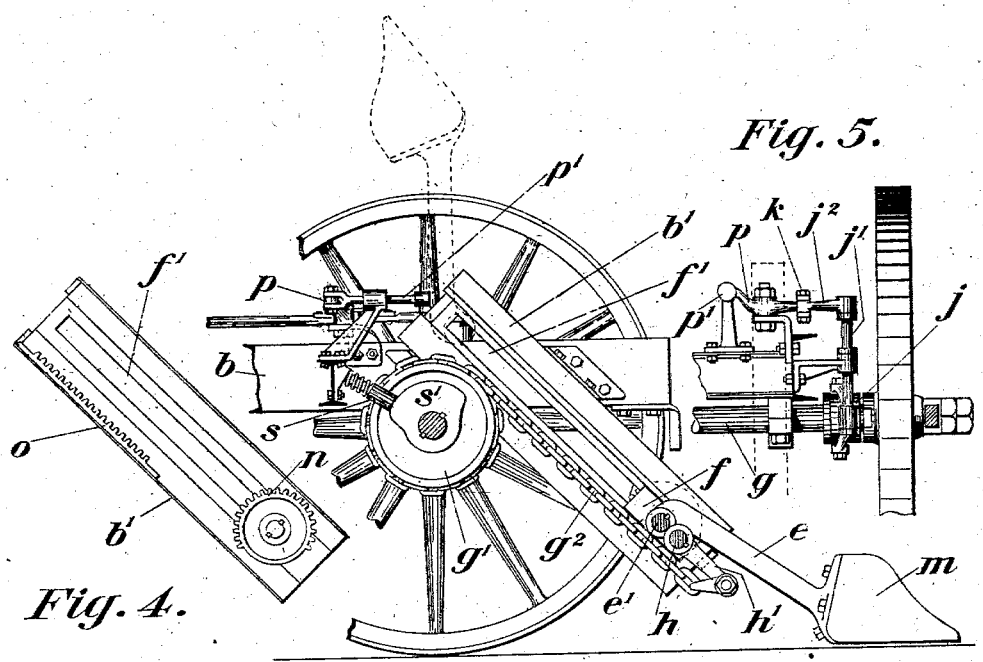
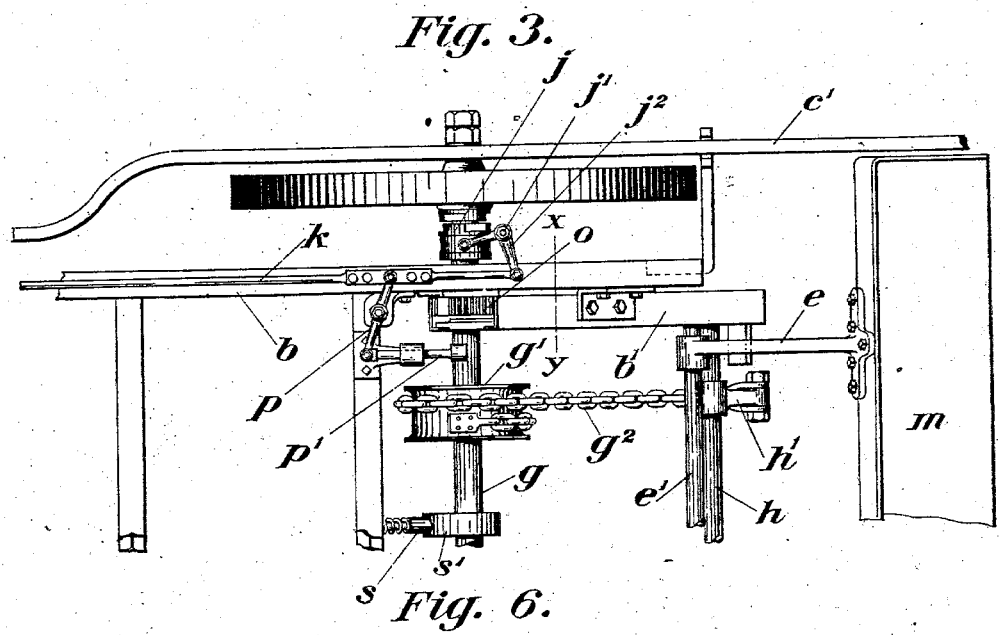
Witnesses
Inventor
Zenas Whittemore
by
Attorney No. 730,502. Patented June 9, 1903.

UNITED STATES PATENT OFFICE.

ZENAS WHITTEMORE, OF MORTON, PENNSYLVANIA, ASSIGNOR OF ONE-FOURTH TO HARRY J. MASON, JR., OF MORTON, PENNSYLVANIA.

STREET-SWEEPER.

SPECIFICATION forming part of Letters Patent No. 730,502, dated June 9, 1903.

Application filed January 27, 1902. Serial No. 91,306. (No model.)

*To all whom it may concern:*

Be it known that I, ZENAS WHITTEMORE, of Morton, Delaware county, Pennsylvania, have invented an Improvement in Street-Sweepers, of which the following is a specification.

My invention relates to street-sweepers; and it consists of certain improvements which are fully set forth in the following specification and are shown in the accompanying drawings.

More particularly my invention relates to that class of sweepers in which a movable pan is employed to receive the sweepings from a rotating brush and empty them into a receptacle. In street-sweepers of this character it is desirable that the pan should be arranged close to the brush, so as to extend to some extent under it, and a part of my improvements relates to the devices for moving the pan backward from under the brush and then elevating it to discharge the sweepings. Owing to the weight of the pan and its contents and the friction of the operating parts, considerable power is required to operate it, and a part of my invention relates to devices for operating the pan from the running-gear of the vehicle. This part of my invention embraces the employment of a clutch device by which the running-gear may be connected or disconnected with the pan-operating mechanism whenever desired. It also embraces an automatic clutch-releasing device for disconnecting the clutch when the pan reaches its highest position, and also a brake or retarding device to prevent too-rapid descent of the pan when the pan-operating devices are disconnected from the running-gear.

My invention also relates to improvements in the manner of supporting the rotary brush, whereby a longer brush may be employed, and it may be easily raised and lowered.

Figure 1:
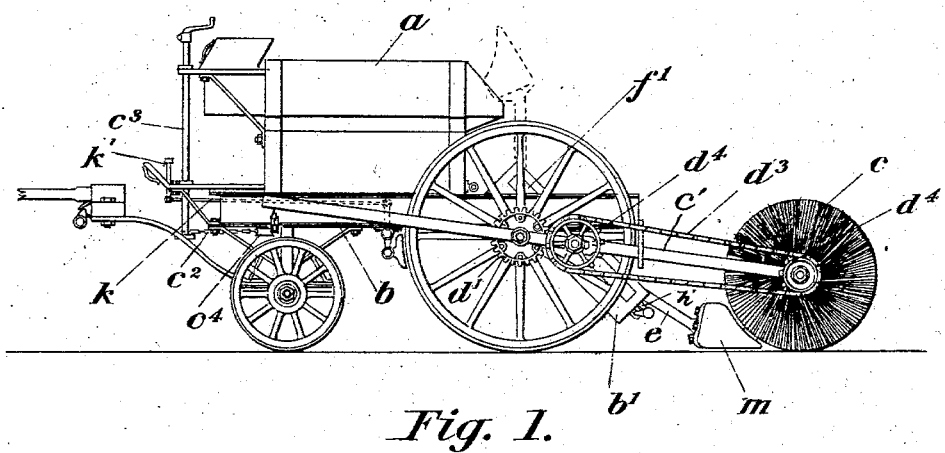
Figure 2:
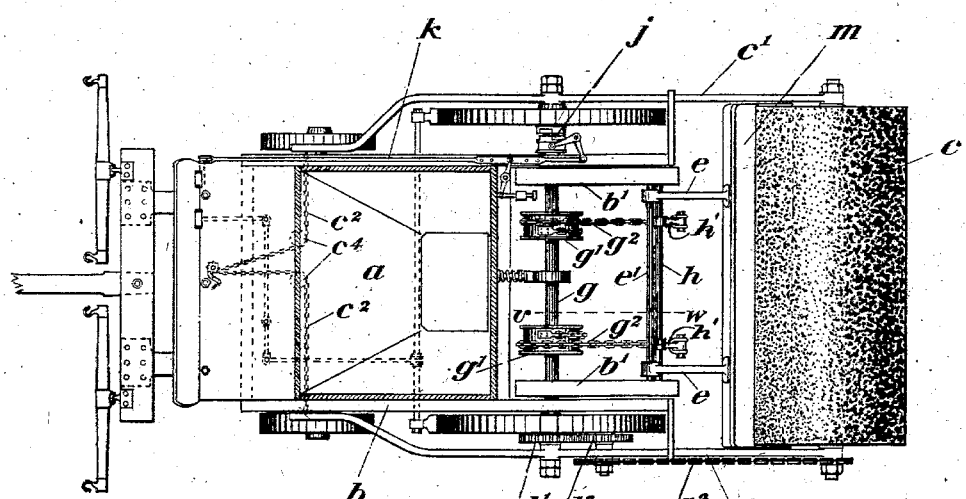

In the accompanying drawings, Figure 1 is a side elevation of a street-sweeper embodying my invention. Fig. 2 is a plan view of the same with the receptacle shown in horizontal section. Fig. 3 is a longitudinal vertical sectional view on the line $v\ w$ of Fig. 2 on an enlarged scale. Fig. 4 is a detail view of one of the rack-frames and pinions for rocking the sweepings-pan. Fig. 5 is a detail view of part of the clutch mechanism for operating the sweepings-pan, taken as a section on the line $x\ y$ of Fig. 6; and Fig. 6 is a plan view of part of said clutch mechanism.

The sweeper consists of a wheeled frame $b$, carrying a sweepings-receptacle $a$, with a rotary brush $c$ journaled in the rear, and a movable sweepings-pan $m$ arranged immediately in front of the brush and adapted to be reciprocated back from the brush and elevated to discharge the sweepings into the receptacle. The brush is driven by suitable power-transmitting connections, such as the gears $d'\ d^2$, chain $d^3$, and sprocket-wheels $d^4\ d^4$ from one of the rear wheels. The pan is arranged close to and projects under the body of the brush, so as to receive the sweepings directly therefrom, and when operated is first moved back, so as to clear the brush, and is then elevated to discharge its contents. A sweeper of this character is described and claimed in my Patent No. 693,474, dated February 18, 1902, and I shall now describe the improvements which constitute the present invention.

To enable the brush $c$ to be lifted when desired either to pass over obstructions or to raise it out of contact with the street-surface, it is journaled in levers $c'\ c'$, which may have their fulcra on the axle-shaft of the rear wheels and their front ends connected through chains or other flexible connections $c^2$ with a vertical shaft $c^3$ adjacent to the driver's seat. The chains or flexible connections may pass about suitable guide-pulleys $c^4\ c^4$. The rotation of the shaft $c^3$ by the driver will wind up the chains on the shaft and elevate the brush. I prefer to arrange the brush-levers $c'\ c'$ on the ends of the axle-shaft outside of the rear wheels, as shown, as this enables me to employ a brush of greater length, fully equal to the distance between the rear wheels.

The pan $m$ is carried by arms $e\ e$ of a rock-shaft $e'$, journaled at the ends in slides $f\ f$, mounted in inclined guides $f'\ f'$ in frames $b'\ b'$, carried by the vehicle-frame $b$. Carried by the rock-shaft $e'$ are pinions $n$, adapted to engage the toothed racks $o$ on the upper ends of the guide-frames $b'\ b'$.

To operate the pan $m$ to empty the sweepings into the receptacle, the slides $f\ f$ are retracted in the guides $f'$. This withdraws the pan from under the brush and in position to be elevated, and when the pinions $n$ engage the racks $o$ the further retraction of the slides $f$ causes the pinions $n$ to rock the shaft and elevate the pan $m$ into the position shown in dotted lines in Figs. 1 and 5, when its contents will fall into the receptacle $a$. On the return of the slides $ff$ their operations are reversed, and the pan $m$ is restored to the former position, extending close to and under the brush.

In my Patent No. 693,474 referred to I have shown power-transmitting connections with the rear axle-shaft for operating the pan and also, as an alternative, a hand-operated device. It is especially advantageous to operate the pan by the running-gear, as the power required to lift the pan with its contents through the medium of the slides $f$, racks $o$, and pinions $n$ is considerable, and it is also desirable that the pan should be operated only at such times as the collection of sweepings shall actually require. Therefore instead of a direct driving connection with the running-gear or devices operated by human power, as shown in my application referred to, I interpose a clutch device in the driving connection, so that the driving devices may be thrown into or out of operation whenever desired.

In the particular construction shown the rear axle $g$ is provided with one or more drums $g'$, connected by chains or cables $g^2$ with the slides $f$. The connection with the slides $f$ is preferably effected through a transverse rod $h$, carried by the slides and provided with arms $h'$, connected with the chains $g^2$. When the chains are wound up on the drums $g'$, the slides $f$ will be elevated in the guides $f'$. One member of the clutch $j$ is fast to the hub of one of the rear wheels, while the other member is keyed on the axle-shaft $g$. The movable member is connected by the usual yoke with a short upright shaft $j'$, which is connected by an arm $j^2$ with the shifter-rod $k$, which extends forward to the driver's seat and may be operated in any convenient manner, as by a foot or hand lever $k'$.

The slides $ff$ and the cross-rod $h$ constitute a reciprocating frame, which carries the rocking frame, consisting of the arms $e$ $e$ and rock-shaft $e'$, by which the pan is carried. The reciprocating frame is operated by the shaft $g$, which is here shown as the rear axle of the vehicle.

As it is desirable that the pan should immediately return to lowered position after it has discharged its contents, I provide means for automatically disconnecting the clutch as soon as the pan has reached its extreme elevated position and has discharged its contents. For this purpose I employ a short lever $p$, pivoted to a bracket on the cart-frame and having one end pivotally connected with shifter-rod $k$ and the other end provided with a pin $p'$, arranged to be struck by one of the arms $e$ or some other part which moves with the pan when the pan reaches its highest position. When the shifter-rod $k$ is operated to connect the clutch, this pin $p'$ will be projected into position to be struck by the pan-arm $e$ when the pan reaches its highest position and will be forced back, thus moving the shifter-rod track and disconnecting the clutch. The pan-elevating mechanism being then disconnected from the rear wheels will return to lowered position by gravity. To prevent too-rapid descent, a friction-finger $s$ may be arranged on the cart-frame, bearing on a cam on the axle-shaft.

While I prefer the details of construction shown, they may be varied in many ways without departing from my invention.

What I claim as new, and desire to secure by Letters Patent, is as follows:

1. In a street-sweeper, the combination with a wheeled vehicle, of a rotary brush, a pan arranged close thereto and adapted to receive the sweepings therefrom, means to elevate said pan to discharge its contents, and power-transmitting connections between said means to elevate the pan and the running-gear embracing a clutch device for throwing said power-transmitting connection into or out of action.

2. In a street-sweeper, the combination with a wheeled vehicle, of a rotary brush, a pan arranged close thereto and adapted to receive the sweepings therefrom, means to elevate said pan to discharge its contents, power-transmitting connections between said means to elevate the pan and the running-gear embracing a clutch device for throwing said power-transmitting connections into or out of action, and means for operating said clutch device extending to the first part of the vehicle.

3. In a street-sweeper, the combination with a wheeled vehicle, of a rotary brush, a pan arranged close thereto and adapted to receive the sweepings therefrom, means to elevate said pan to discharge its contents, power-transmitting connections between said means to elevate the pan and the running-gear of the vehicle, a clutch device for throwing said power-transmitting connections into or out of operation, and means for automatically disconnecting said clutch when the pan is elevated.

4. In a street-sweeper, the combination with a wheeled vehicle, of a rotary brush, a pan arranged close thereto and adapted to receive the sweepings therefrom, means to elevate said pan to discharge its contents, power-transmitting connections between said means to elevate the pan and the running-gear of the vehicle, a clutch device for throwing said power-transmitting connections into or out of operation, and means actuated by a part moving with the pan to automatically disconnect said clutch when the pan is elevated.

5. In a street-sweeper, the combination with a wheeled vehicle, of a sweepings-pan, a rocking frame carrying said pan, means to reciprocate said frame, power-transmitting connections between said means to reciprocate said frame and the running-gear of the vehicle embracing a clutch device for throwing said power-transmitting connections into or out of action, and means to rock said frame upon its axis during a portion of its reciprocation.

6. In a street-sweeper, the combination with a wheeled vehicle, of a sweepings-pan, a reciprocating frame carrying said pan, a rotary shaft carried by the vehicle, flexible connections between said rotary shaft and the reciprocating frame adapted to be wound upon said shaft when it is rotated and to move the reciprocating frame, and a clutch device for connecting said rotary shaft with the running-gear of the vehicle.

7. In a street-sweeper, the combination with a wheeled vehicle, of a sweepings-pan, a reciprocating frame carrying said pan, a rotary shaft carried by the vehicle, flexible connections between said rotary shaft and the reciprocating frame, adapted to be wound upon said shaft when it is rotated and to move the reciprocating frame, a clutch device for connecting said rotary shaft with the running-gear of the vehicle, means to rock said pan in its reciprocating frame during a portion of its movement, and automatic devices to release the clutch device when the pan has reached its highest position.

8. In a street-sweeper, the combination with a wheeled vehicle provided with guides, slides movable in said guides, a rocking frame carried by said guides, a sweepings-pan carried by said rocking frame, means to move said slides in their guides, power-transmitting connections between said means to move the slides and the running-gear of the vehicle, embracing a clutch for connecting and disconnecting said power-transmitting connections with the running-gear, and means to rock said rocking frame during a part of the movement of said slides.

9. In a street-sweeper, the combination with a wheeled vehicle provided with guides, slides movable in said guides, a rocking frame carried by said guides, a sweepings-pan carried by said rocking frame, a rotary shaft, connections between said rotary shaft and the slides, a clutch for connecting or disconnecting said rotary shaft with the running-gear of the vehicle, and means to rock said rocking frame during a part of the movement of said slides.

10. In a street-sweeper, the combination with a wheeled vehicle provided with guides, slides movable in said guides, a rocking frame carried by said guides, a sweepings-pan carried by said rocking frame, a rod connecting said slides, a rotary shaft, flexible connections between said rod and rotary shaft with the running-gear of the vehicle, and means to rock said rocking frame during a part of the movement of said slides.

11. In a street-sweeper, the combination with a wheeled vehicle, of a sweepings-pan, a movable frame carrying said pan, a rotary shaft operated by the running-gear of the vehicle, flexible connections between said shaft and the movable frame adapted to be wound upon said shaft when it is rotated to operate the movable frame and move the sweepings-pan.

12. In a street-sweeper, the combination with a wheeled vehicle, of a sweepings-pan, a movable frame carrying said pan, a rotary shaft operated by the running-gear of the vehicle, flexible connections between said shaft and the movable frame adapted to be wound upon said shaft when it is rotated to operate the movable frame and move the sweepings-pan, and a friction-retarding device acting on said shaft.

13. In a street-sweeper, the combination with a wheeled vehicle, of a reciprocating and rocking sweepings-pan, power devices operated by the running-gear to move said sweepings-pan, a clutch to connect or disconnect said power devices with the running-gear, and a clutch-releasing device controlled by the pan, to automatically release and clutch when the pan has reached its highest position.

In testimony of which invention I have hereunto set my hand.

ZENAS WHITTEMORE.

Witnesses:
  J. F. BEATTY,
  L. D. COOKE.